June 10, 1941.    F. D. CORNELL    2,244,677
SYSTEM OF PLANT PRODUCTION
Original Filed July 6, 1937    7 Sheets-Sheet 3
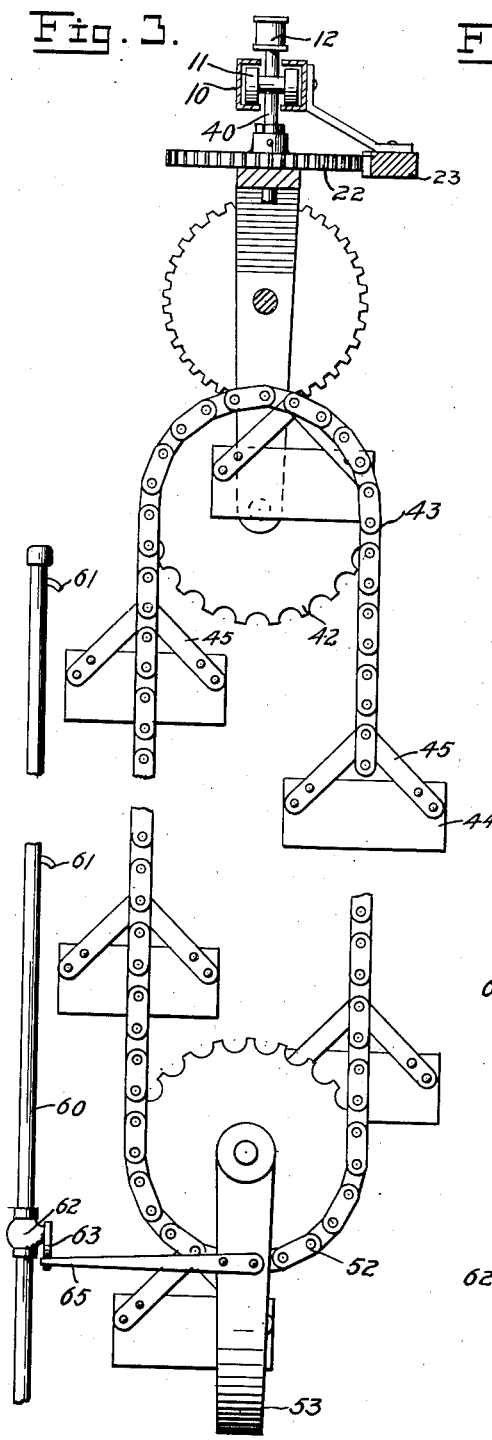
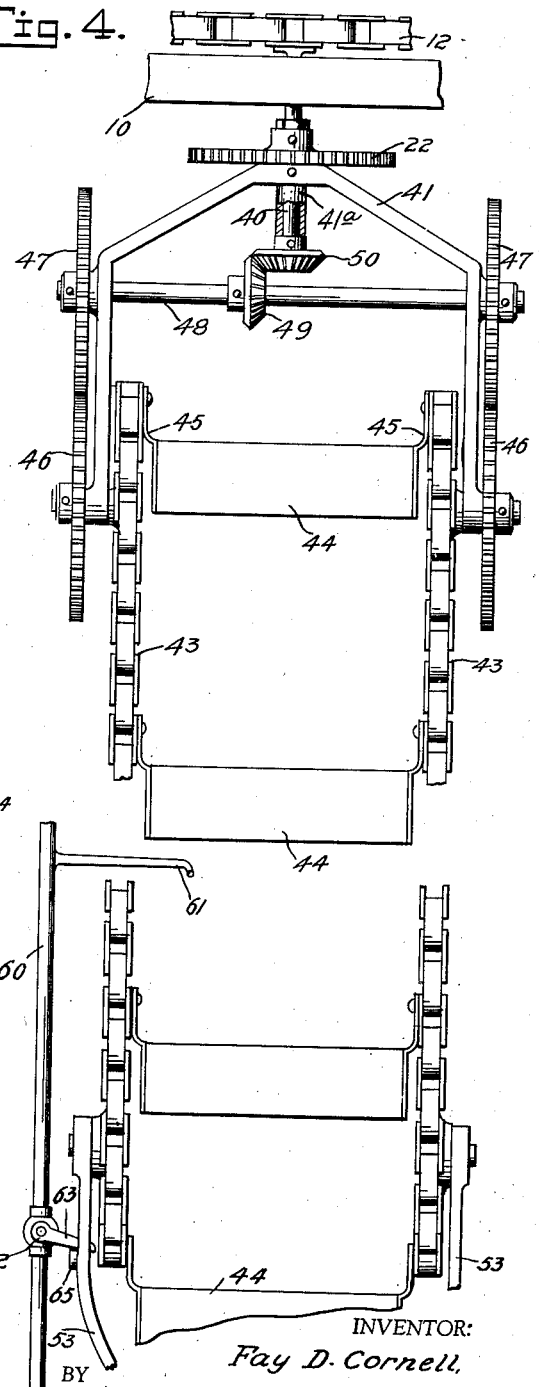
INVENTOR:
Fay D. Cornell,
BY  O O Martin
ATTORNEY.

June 10, 1941.  F. D. CORNELL  2,244,677
SYSTEM OF PLANT PRODUCTION
Original Filed July 6, 1937  7 Sheets-Sheet 4

INVENTOR:
Fay D. Cornell,
BY O. O. Martin
ATTORNEY.

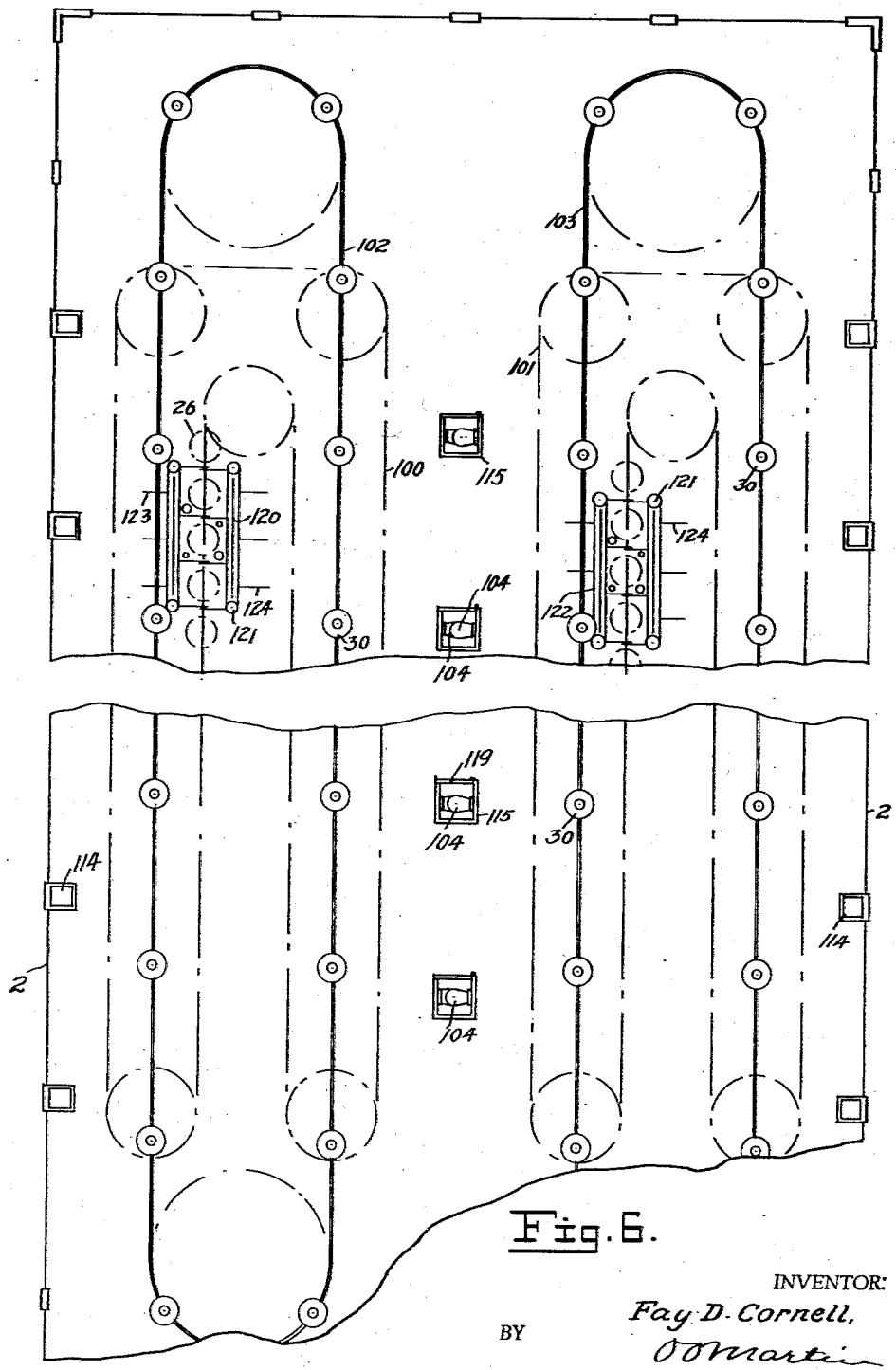

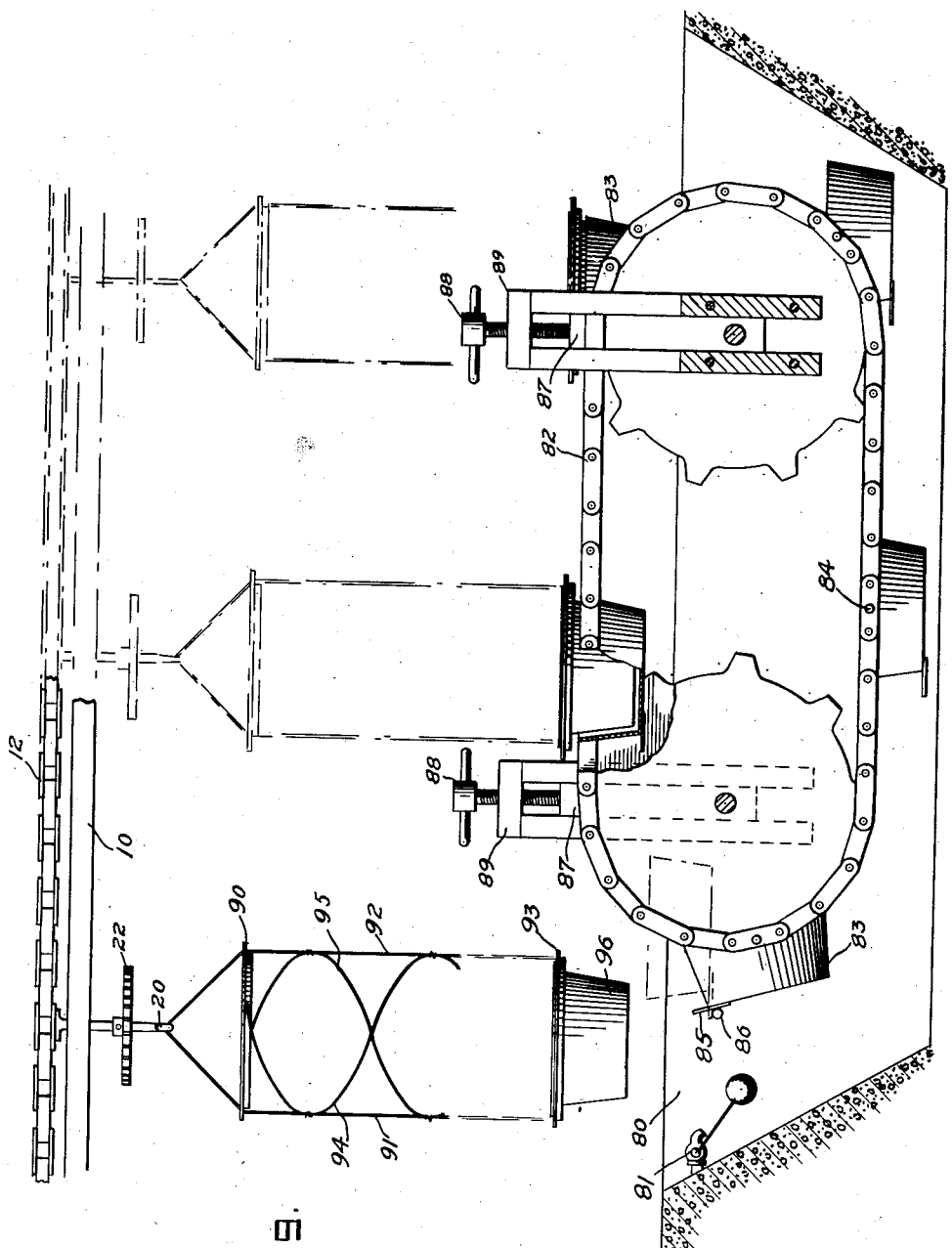

Patented June 10, 1941

2,244,677

UNITED STATES PATENT OFFICE 2,244,677

SYSTEM OF PLANT PRODUCTION

Fay D. Cornell, Pasadena, Calif.

Application July 6, 1937, Serial No. 152,007
Renewed May 21, 1940

45 Claims.  (Cl. 47—17)

The present invention relates to the propagation of plant life and to the culture of plants, particularly the more valuable forms of plant life which do not require too extensive space nor too long time for maximum development.

Production of plant life as heretofore almost exclusively commercially practiced is dependent upon and subject to atmospheric vicissitudes, insects and disease scourges, and various other conditions over which no human control has been found possible.

It is the general object of the present invention to provide means for the complete control on a commercial scale of plant life production. To this end it is a further object of the invention to provide a suitable building within which plants may be produced substantially or entirely independent of outside atmospheric conditions.

A further object of the invention is the provision of means of interior arrangement designed to provide controlled uniform light and air conditions within such building.

It is a further object of the invention to provide means affording each individual plant produced an equal opportunity for complete, regular and uniform exposure to the air and light facilities provided within the building.

It is a still further object to provide means for convenient and efficient servicing of the plants within the building.

A further object is the provision of means for automatically and periodically furnishing nutriments to the plants within the building.

It is also an object to provide within the building means comprising controlled spaces for applying suitable chemical, electrical or magnetic treatments to the plants at certain pre-determined times and in controlled volume and duration.

Figure 1:
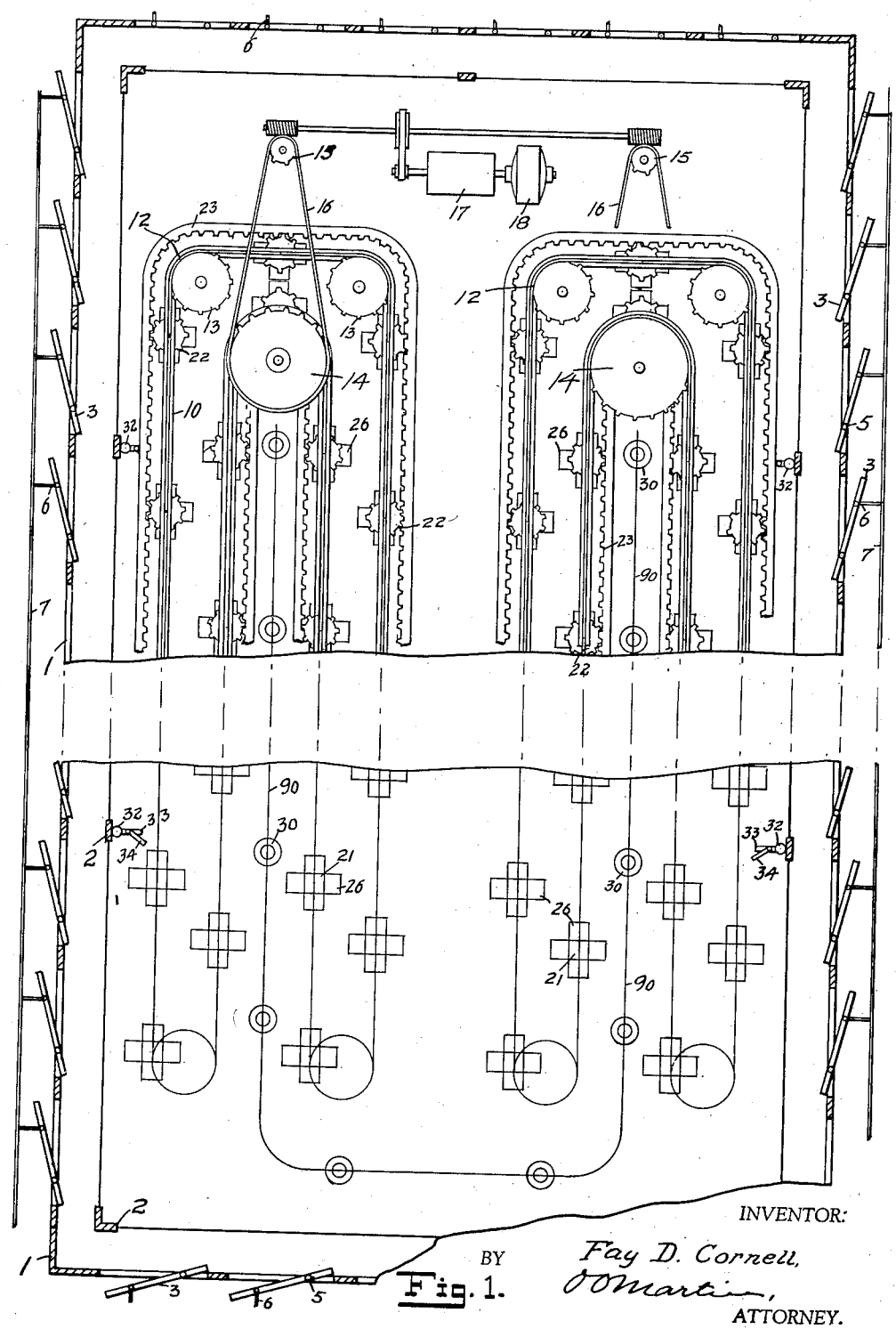
Figure 2:
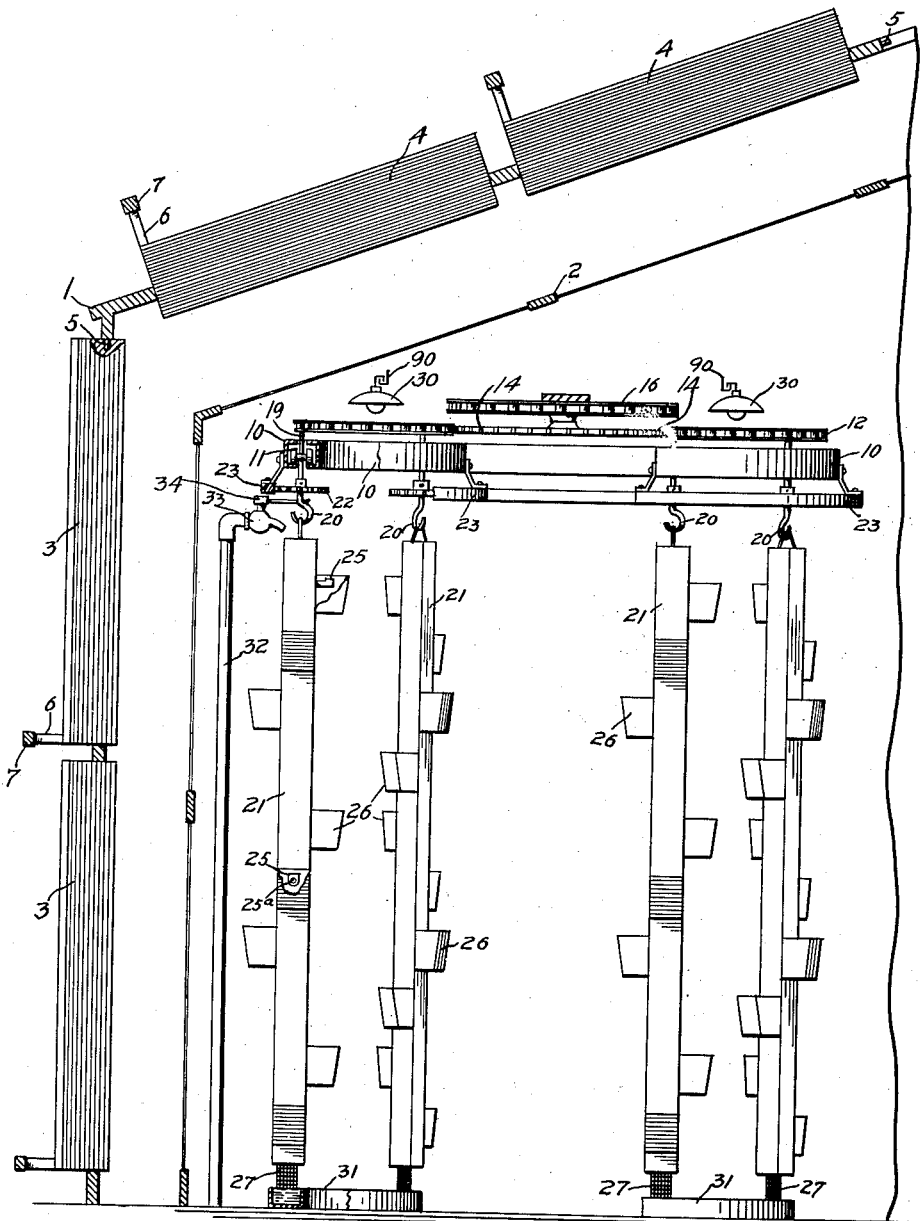
Figure 5:
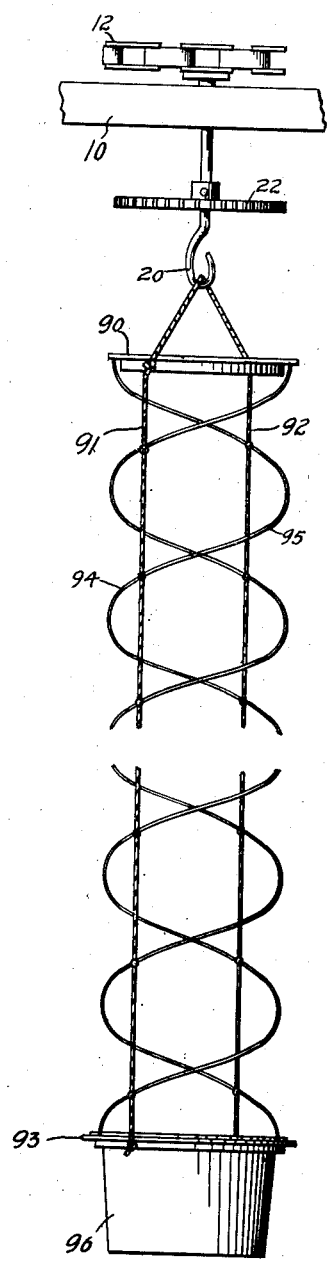
Figure 8:
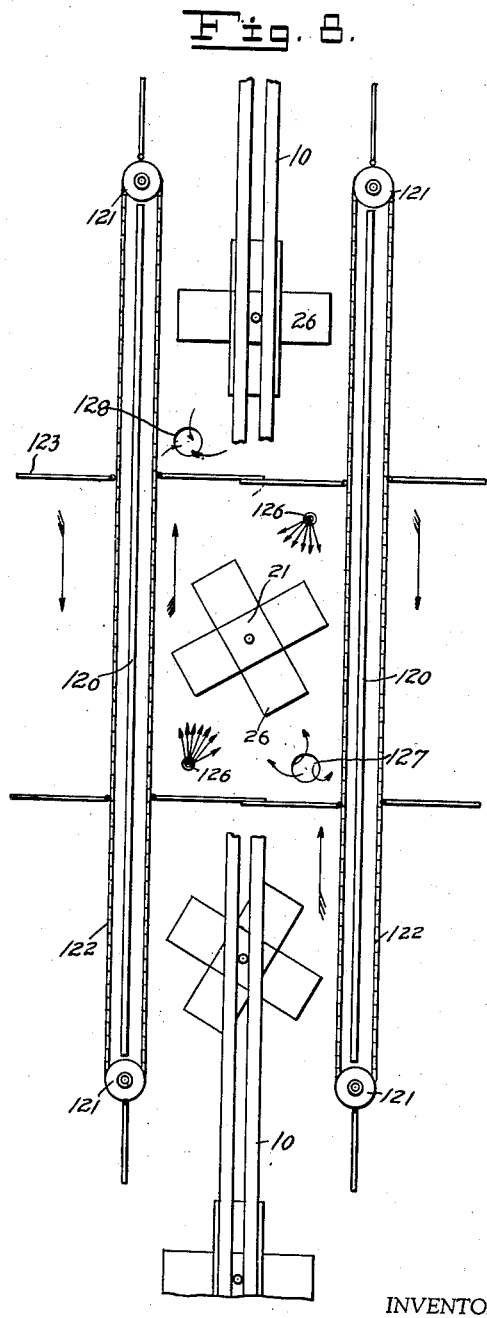
Figure 7:
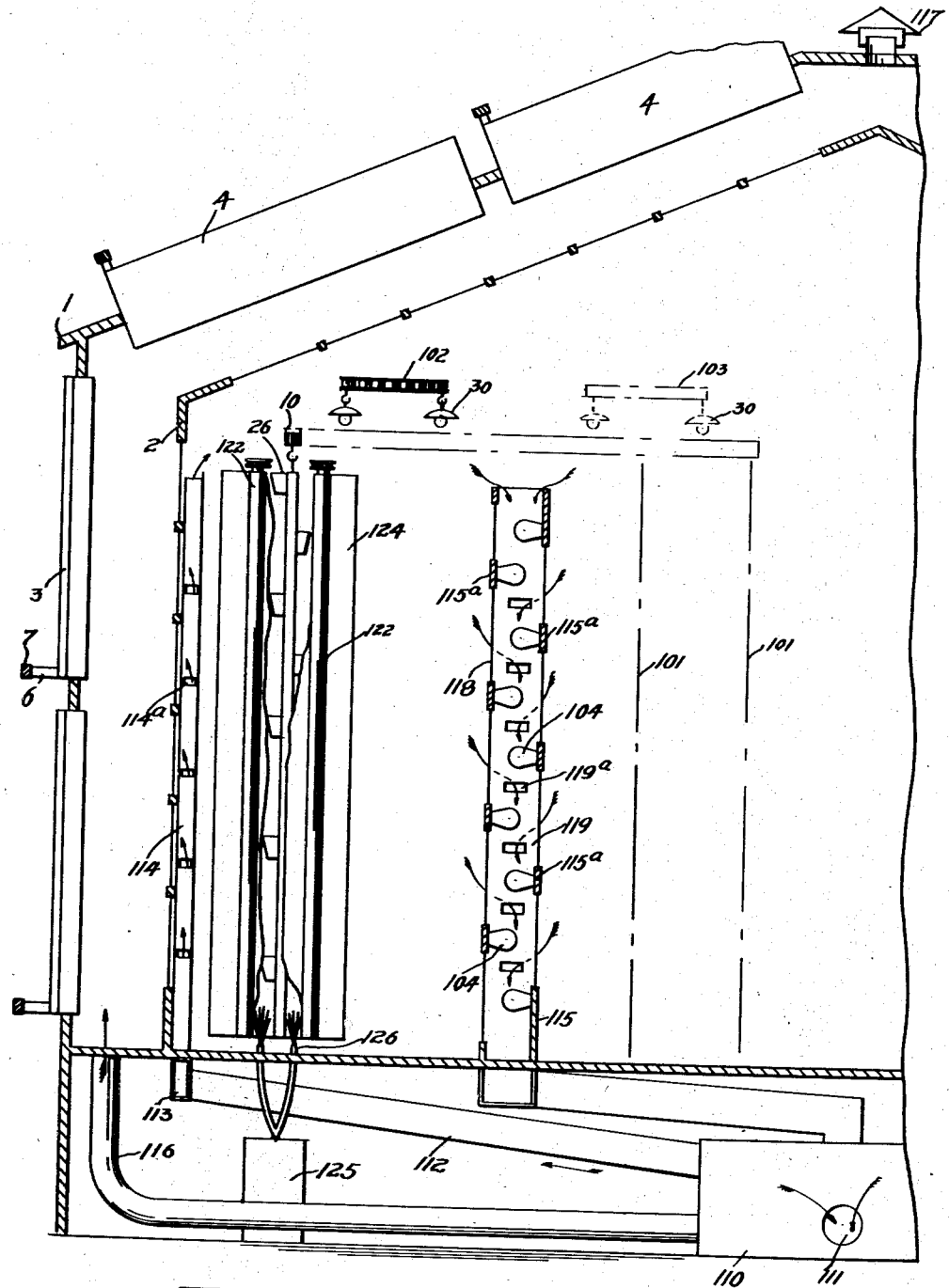

Drawings illustrative of preferred forms of the invention are hereto annexed, in which:

Fig. 1 is a diagrammatic plan view of a building within which the devices of the invention are shown placed substantially as in practice, Fig. 2 is a sectional elevation of part of the building, taken substantially on line 2—2 of Fig. 1, Figs. 3 and 4 are fragmentary elevations showing a modified form of plant carrier mountable within the building, Fig. 5 illustrates a further modification of the plant carrying devices, Fig. 6 shows, diagrammatically, the arrangement of light, air and spraying or fumigating devices of the invention, Fig. 7 is an elevation of a corner of a building of somewhat different construction, and it includes features disclosed in Fig. 6, Fig. 8 is an enlarged plan view of a portion of Fig. 6, a description of which is given below, and Fig. 9 is a fragmentary elevation illustrating preferred means for supplying water or other liquid compounds to the plant receptacles of the invention.

Because it is fundamental in my system of plant life production to maintain all plants at all times within a building, it is thought best in the first instance briefly to describe the more important characteristics of such building. To this end reference is invited to Figs. 1 and 2 in which a portion of the building structure embodying the important features of the invention is illustrated. While the size or shape of the building itself is not essential, it may be well to mention that I have found a relatively long rectangular building most suitable and that I prefer to point such building north to south.

The building is shown to comprise an outer light and air-tight shell 1 and an inner transparent casing 2. The latter may be an ordinary glass greenhouse, the height and width proportions of which will be specifically referred to presently. The outer shell consists of a framework, in the walls and roof of which are provided as many shutters 3 and 4 as it is possible to install without weakening the framework of the shell. The shutters 3 of the wall and 4 of the roof may all be constructed alike and proportioned to fit the spaces available, the important point to consider being that the maximum amount of light may be admitted when and if desired.

Each shutter is hung on pivots 5 and it is shown fitted with an arm 6, the outer end of which is fastened to a common control bar 7, by means of which each row of shutters may be swung into open or closed position. These shutters may be manually operated or power machinery may be provided for the operation, if preferred.

The framework of the walls and roof, as well as the shutters, must all be tightly inter-fitted and made from material insuring complete light and heat insulation, but the particular construction is immaterial so long as maximum light and complete insulation is attained. It is to be noted that to this end the shutters may gradually be turned to follow the direction of the sun, and this may be done automatically by clock control, if desired.

In view of the foregoing, it is seen that I have provided a building which may be substantially completely opened to sunlight when desired, and tightly closed to outside light and atmospheric conditions when necessary. There will of course be doors providing entrance to and exit from the building, also tightly fitting and heat insulating, but it is not thought necessary to show such doors.

Within the building is provided a system of overhead tracks suitably arranged. In Figs. 1 and 2 the arrangement of this system is shown to consist of continuous tracks extending the full length of the building to form U-shaped double loops 10 disposed throughout the length of the building. Both ends of the building may be substantially alike and the intermediate portion would show a series of these double loop tracks. On these tracks are placed hangers 11 to which means for supporting plant receptacles are secured. These hangers are all suitably inter-connected to form conveyors continuously propelled along the track at a pre-determined slow speed.

The inter-connecting means is herein shown to comprise an endless chain 12 hung on a series of sprocket wheels 13. One sprocket wheel 14 of each conveyor is secured to a shaft which in turn by means of a sprocket 15 and chain 16 and suitable well-known speed reducing device 17 is connected for operation by a prime mover 18. The hangers 11 are by means of arms 19 shown operatively connected to the links of the chain 12.

The plant supporting receptacles held suspended from the hangers 11 may be of various kinds to suit the plant species to be carried. Such receptacles are hereinafter described in order to demonstrate the principle of operation of the invention.

In Fig. 2 each hanger 11 terminates in a pendant hook 20 from which a box-shaped frame 21 is held suspended. This hook is free to rotate relative to the hanger and each hook carries a gear wheel 22 permanently in mesh with a toothed rack 23, rigidly held suspended from the track 10. This device is added for the purpose of imparting continuous axial rotation to the hook 20 and to the pendant frame 21 while the latter is slowly following the line of travel of the hangers.

The frame 21 is made with projecting hooks 25 on which boxes or wire mesh baskets 26, hereinafter termed the pots, are supported, and it is noticed that these pots are helically arranged around the frame.

Above the conveyors and between the conveyors is provided a system of artificial lights 30, which lights are arranged to illumine the pots 26 and the frames 21 as the latter slowly travel past the lights, and as these frames continuously rotate while traveling, it is seen that all the pots 26 receive a uniform portion of the light provided, whether this light radiates from the lamps 30 or comes through the wall and roof openings when the shutters 3 and 4 are open.

The arrangement described is quite flexible. The plants in the pots may receive light continuously from the sun during daylight hours and from the lights 30 at night, or from the latter both day and night, or alternate periods of light and darkness of any desired duration may be provided. In other words, so far as light is concerned, the building is under complete control and each plant may be supplied a pre-determined amount of light.

The provision of the outer housing 1 offers the additional advantage of protecting the inner glass house against damage from outside sources, such as wind storms, hail and snow.

The arrangement of the pots 26 on the suspended frame 21 is preferable in connection with production of small plants, such as strawberries, which do not attain any appreciable height. The frames 21 may conveniently be filled with absorbent material, such as peat moss, which may be maintained wet by capillary attraction by means of wicks 27 trailing through a water-filled trough or ditch 31 on the floor of the building, as indicated in Fig. 2, or water may be supplied from a stand pipe 32 controlled by a spring closed valve 33, and an arm 34 of this valve extends into the path of travel of the hooks 20 to cause the valve to be opened each time a frame 21 travels past the valve and to deliver a desired amount of water to the material within the frame. The hooks 25 on which the pots 26 are hung are tubular and made with an orifice 25$^a$ through which water from the material within the frame may seep into the pots to irrigate the plants. There may, of course, be provided as many stand pipes as found necessary properly to irrigate the plants.

At the present time there is a movement towards plant production without soil, water alone to which certain chemicals are added being depended on to supply the necessary nourishment to the roots of the plants. Where desired to employ this system of culture, it is merely required to make the frames 21 and the pots 26 water-tight. The proper solution may then be maintained within the frames and suitable drip valves should be installed in the passage through the hooks 25 to replenish the solution within the pots.

The servicing of the plants should take place at some one convenient point along the line of travel, preferably at one end of the building, and it is seen that all work of cultivating, fruit picking, etc., can be done systematically, effectively and thoroughly with the least possible expenditure of human effort from this one station.

The space within the inner shell should of course be air-conditioned to provide the temperature and moisture contents required by the species of plant life produced within the building, and means for administering special treatments to the plants should be provided as will presently be more fully explained.

The frames 21 with the pots 26 may be used to advantage within a low building where the attendants can reach the uppermost plants with ease, but such low building may frequently prove too expensive to maintain, and it may be preferable to substitute a building of considerable height, thereby adding greatly to the space available for plant production.

Such building is in Fig. 3 shown to embody the features of light control above described. The track system 10 may also remain substantially the same, but the hangers are modified to comprise axially non-rotatable stems 40 to each of which a yoke 41 and a gear wheel, similar to the wheel 22 or identical therewith, are rotatably hung. The gear wheel and yoke are shown secured to a sleeve 41$^a$, of a length to rest on a bevel gear 50 of the stem, thereby to maintain the parts axially in position on the stem. From this it is seen that the yoke is caused to rotate while it is carried along the track 10.

In the yoke is rotatably mounted a pair of sprocket wheels 42 and a chain 43 is hung on each of these wheels to form a conveyor fitted to carry equidistant boxes or baskets 44. These baskets are fastened to the chains by means of brackets 45 which permit the baskets to swing on the links of the chains in order that they may retain normal horizontal position while the chains pass over the wheels. The latter are mounted to rotate with gear wheels 46, and these in turn are in mesh with gear wheels 47 of a shaft 48, to which is secured a bevel gear 49 in mesh with the bevel gear 50 of the stem 40. Sprocket wheels 52 mounted in a frame 53 should be placed at the bottom of each basket carrier to maintain the baskets in proper alignment or plain sheaves may be substituted if preferred.

Through the medium of the aforesaid gear connections it is seen that the baskets are caused to travel along the track with the chain 12; that they are continuously rotated as a unit above the axis of the stems 40; and that at the same time they travel vertically with the chain 43. Because of this additional vertical movement of the baskets it is possible for the attendant to service the baskets from one definite position, or if several attendants are employed, for each attendant to remain at his station while the plants in the baskets slowly pass before him. These three movements of the baskets should of course be very slow and correctly timed always to bring each basket to a particular point at a predetermined moment. When this is accomplished it is seen that it also is possible to irrigate the baskets as they pass a given point or points. The irrigation may be effected manually or stand pipes may be provided as indicated at 60, having a nozzle 61 through which water may be delivered to the baskets. The stand pipe is shown controlled by a valve 62 provided with an arm 63 which is lifted by a projection 65 of the frame 53. Gravity may return the arm 63 and so restore the valve to closed position, or a spring-held valve may be substituted.

Some plants, such as tomatoes and cucumbers, of trailing or climbing habits, reach a very extended growth, and the basket arrangements hereinbefore described might not prove entirely satisfactory. It is possible, however, to devise means better suited for such plants, and such means is in Figs. 5 and 9 shown to comprise a collar 90, held suspended from each hook 20. To diametrically opposite sides of this collar are fastened ropes 91, 92, the lower ends of which support an annular collar 93. Helical wire coils 94, 95 are fastened at the ends to the collars 90 and 93 and they are, at certain equidistant points along the periphery, attached to the ropes 91, 92 in any suitable manner. A pot 96 is then seated within the lower collar 93. In the drawings, this helical support is shown fully extended. In actual practice, however, enough coils would be taken up at the top and tied to the upper collar 90 to reduce the support to the proper height.

Trailing or climbing plants are set in the pots, one for each of the two helical coils, and as the plants grow are induced to follow the coil, with the result that the plants assume a growth of uniform cylindrical shape, adequately supported, completely and uniformly subjected to ideal condition of light and air to induce most prolific flowering and fruiting. It is, of course, necessary to remove all lateral shoots to induce the strongest growth of the terminal shoot.

Experience has shown that such plants when properly grown in greenhouses and fed with adequate and proper plant nutrients, which have been found most beneficial, will quickly attain great height and produce enormously. In ordinary greenhouses, however, it is found necessary to top the plants on account of limitations in space, thereby sacrificing much of the possible growth and shortening the productive life. By training the plants upward along the double helix provided, a great continued growth is provided for in a limited space, thereby lengthening the productive life of the plant.

It has also been found in ordinary greenhouses, wherein such plants are trained perpendicularly on a string or support, that very soon the lower part of the plant becomes bare, due to the maturing fruit and falling leaves, superinduced by lack of evenly distributed light and air, and soon the available part of the greenhouse, within easy working reach, is largely occupied by these overly shaded bare stems, and often a diseased condition sets in. In order to take the fullest advantage of the growth and fruiting possibilities under ideal conditions, I have found it desirable, from time to time, to decrease the space at the bottom of the plant and to correspondingly increase the space at the top, which is accomplished in the following manner. When unproductive vine develops at the bottom, the attendant lifts the pot out of engagement with the support, raises it to the desired height and rearranges the pot with the support, whereupon the unsupported section of the helical coil, bearing the unproductive stem becomes a flat coil at the circumference of the pot. Likewise the support at the top is disengaged, the necessary section of unused coil is let down, and the support reengaged, causing the pot to assume its original position, the unproductive stem is coiled at the bottom, the productive plant is in normal, ideal position, and added space is provided at the top for further growth.

It has been hereinbefore stated that, to provide the proper nutrient solution to the plants is most important. This may be done by standpipes, as indicated at 60 in Fig. 3, or the solution may be brought to the pots or baskets in the manner illustrated in Fig. 9. A pit 80 is, in this view, shown sunk into the floor and this pit is maintained filled to a predetermined level with a required solution. A float valve 81 may be provided to maintain the liquid level. A conveyor 82 is hung in this pit and it is filled with pivotally hung buckets 83 which rise out of the solution to embrace the pots 96. These buckets travel with the pots long enough thoroughly to saturate the contents of the pots, whereupon they sink back into the solution. It is well to trip the buckets on the pivots 84, as they sink into the solution, thereby to spill their contents into the pit, substantially as indicated in dotted outline. The buckets are for this purpose shown made with projections 85 to engage a stationary projection 86 to cause the buckets to turn over in order to make certain that solution of uniform quality always reaches the pots. The conveyor is preferably made vertically adjustable within the pit, and this adjustment is here shown effected by mounting its shafts in sliding bearings 87, operable by screws 88 seated in the top of guide frames 89. In such manner, the solution may be maintained at any desired height and, if the pit is made deep enough, it is possible to sink the whole conveyor into the pit, out of the way of the passing pots, when its use is not required.

In the foregoing, it has been my aim to describe and explain novel means for maintaining growing plants of various kinds within an air and light controlled building; to describe means for continuously and uniformly moving such plants through the building in the proper manner to afford each plant full benefit of the air and light facilities; and to explain the advantage of the system of the invention from a servicing point of view.

Means will now be described for supplying such light effects and air supply as are considered most beneficial to plant growth within the environments herein presented. The term "air" has been solely employed, for the sake of simplicity and for want of a generic term, but it will now appear that this term is meant to include not only air and temperature of air, but other fluids and gases, and also to include ionization, the introduction of all of which is considered beneficial to plant growth. The term "light", hereinbefore exclusively used, refers also to rays of frequencies other than ordinary light rays, where such other rays are found beneficial.

Fig. 6 is diagrammatically drawn to indicate the arrangement by means of which such rays, gases and fluids may be applied to the system of the invention. In this view, the outer shell 1 of the building is, for the sake of clearness, omitted but in practice should ordinarily be present. The conveyors and the plant supports thereon, as well as the driving mechanism for these devices, should remain as above suggested, and they are in this view merely indicated by the broken lines 100 and 101. Similarly, the lights 30 are shown held suspended from endless conveyors indicated by the lines 102, 103, see also Fig. 7. These lines of light are positioned above the plant conveyors and arranged to travel horizontally between each two lines of plant supports, and to extend beyond the plant conveyors at the end of the house into position where the attendant may effectively service the lights, make replacements, polish the globes as well as the reflectors, and thereby maintain the efficiency of the lighting system with a minimum expenditure of labor. In addition, there may be provided in the aisle between the conveyors, or between the reaches of each conveyor, as indicated in Fig. 7, vertical batteries of lamps 104, in single or multiple units and designed to direct rays laterally against the moving plants. The rays emanating from these lamps should, of course, be of a kind considered most beneficial. These lamps may be enclosed in casings having transparent fronts capable of transmitting the particular rays furnished by the lamps. Such enclosing means permits the heat generated by the lamps to be carried away in case such additional heat is found objectionable. In other cases, the casings may be omitted. The application of rays from such lamps may be continuous or intermittent as best suited to the plant species served.

Below the floor of the building is placed air conditioning and circulating equipment, conventionally indicated at 110, which draws air from the outer atmosphere through a duct 111. After being washed and otherwise conditioned, this air is forced through ducts 112, 113 and 114, along the inner wall surface to a point near the top of the building. This air circulates through the building and is thereupon drawn back into the basement through ducts 115, placed along one of the aisles of the building, finally to be exhausted into the atmosphere through ducts 116. As shown in Fig. 7, this exhaust air may be directed into the space between the inner and outer housings, through which it may rise, when the shutters are closed, finally to exhaust through one or more roof vents 117. In this manner, it is seen that the exhaust air may be employed more effectively to insulate the inner space from outside atmospheric conditions. These vents should preferably be constructed to pass outgoing airflow but to prevent inflow of air which would tend to disturb controlled air conditions within the building.

It was above stated that the batteries of lamps 104 are placed within tubular columns in the aisles. For the sake of simplicity, these lamps are, in Fig. 7 shown placed within the ducts 115, but preferably they should be placed within separate columns. When placed within the ducts 115, they may be mounted on cross members 115ª, and the latter may be staggered, substantially as indicated, in order that the path of the rays may not be obstructed. The spaces between the cross members should be fitted with ray transmitting panels 118. For convenience in servicing the lamps, it should be possible to open the columns, and this may be accomplished by mounting one side of each column on hinges to provide doors 119, through which ready access to the lamps is gained.

In the wall ducts and in the columns may be provided apertures 114ª and 119ª, operative more evenly to distribute and collect the air flowing through the building. The apertures 114ª should preferably be directed to cause the inflowing air to rise along the panes of the inner wall 2, rather than directly towards the plants, in order more effectively to maintain within the building uniform conditions.

In the system of my invention, where only sterilized soil should be used and where only washed air enters the building, it should be possible to combat insect and fungus pests which may be introduced through seeds, bulbs, plants and cuttings brought from the outside. In the open orchard or field, and in the ordinary greenhouse, this is an onerous, expensive and frequently ineffective operation. But in the system of my invention, because the plants are in motion, it is possible, in a simple, convenient, inexpensive and practically automatic manner, to treat the plants individually for such disease and pest elimination, and without exposing the attendants to the hazards of the gases, chemicals, or rays employed. In like manner, the plants may as readily be treated individually with the beneficial gases, rays, ionization, electrical and magnetic treatments known to be helpful to plant growth. To this end, I have provided one or more cabinets through which the plants are made to travel. Such cabinet is, in Figs. 6, 7 and 8, shown to comprise a wall section 120, arranged on each side of the passing plants in the pots 26, 44 or 96. At the ends of these wall sections are mounted sprocket wheels 121, on which chains 122 are hung, and these chains support door members 123, 124, which are caused to move in synchronism with the plants, thereby temporarily to enclose a desired number of plants within the wall sections and the doors, each pot or column of pots taking its place within a separate compartment, as indicated in the drawings.

Beneath the floor is placed suitable mechanism 125, including spray pumps for forcing liquid through nozzles 126 to the plants. Such well known spray equipment can be arranged thoroughly to soak every part of each plant. Fumigating devices of any suitable, well known kind, should be included in the mechanism 125, to deliver fumes through a duct 127, and these fumes are later drawn out through a duct 128, substantially as indicated in Fig. 8, far enough from the inlet 127 to make certain that the two ducts never open into the same compartment. If these cabinets are not to be used all the time, it may be well to make them demountable, in order not to interfere with light and air movement through the building.

It should be understood that the size, shape and manner of construction of the building is extremely flexible, and the building may be erected with or without the outer insulating shell, according to the climatic requirements and the intended uses of the structure.

I claim:

1. In a system of plant production, conveyors, plant receptacles held suspended from said conveyors, means for circulating said conveyors with the said receptacles, and means for rotating the receptacles on a vertical axis in timed relation to the movement of the conveyors.

2. In a system of plant production, tracks, tubular members on said tracks, plant receptacles on said members, means for moving said members along said tracks, and means for supplying water and plant food to said receptacles through the said tubular members.

3. In a system of plant production, tracks, members on said tracks, means for moving said members along the said tracks, plant receptacles mounted on said members, means for axially rotating the members in time relation to said movement, moisture absorbing material in said members and receptacles, and means for applying water and plant food to said material.

4. In a system of plant production, conveyors, members held suspended from said conveyors, means for moving said conveyors, plant receptacles on said members, and means for supplying liquid to said members while in motion, said liquid to seep into said receptacles.

5. In a system of plant production, plant receptacles, a track, means for circulating said receptacles along said track, and cooperating means for moving the receptacles relative to said circulating means while the latter is moving.

6. In a system of plant production, conveyors, plant receptacles suspended from said conveyors, means for circulating said conveyors, and means for circulating said receptacles vertically relative to the conveyors in timed relation to the movement of the conveyors.

7. In a system of plant production, endless tracks, receptacles held suspended from said tracks by flexible means, and helical members extending upward from said receptacles and fastened to said means, along which to train plants growing in said receptacles.

8. In a system of plant production, endless tracks, receptacles held suspended from said tracks by flexible means, helical plant supports extending upward from said receptacles and fastened to said flexible means along which to train plants grown in said receptacles, and means for rotating said receptacles and helical supports while moving along the tracks.

9. In a plant production system, conveyors, means carried by said conveyors comprising helical coils along which to train growing plants, means for lengthening said coils at the growing end of the plants, and means for simultaneously equally shortening the coils at the base of the plants.

10. In a plant production system, an endless conveyor, plant receptacles, means carried by said conveyor for supporting said receptacles, a pit for irrigating liquid, a conveyor traveling in and out of said pit in timed relation to the first conveyor, and buckets on the pit conveyor positioned to encompass said receptacles as the buckets rise out of said pit, and to move a desired distance with said first named conveyors.

11. In a plant production system, a light and air controlled housing, plant receptacles, means for circulating said receptacles within the housing, lamps, and means for circulating said lamps relative to said circulating receptacles to provide uniform exposure of the plants in the receptacles to the lamps.

12. A system of plant production comprising a light controlled and air conditioned building, plant receptacles, means for circulating said receptacles through the building, and means for turning said receptacles while they circulate through the building.

13. A system of plant production comprising a light controlled and air conditioned building, plant receptacles, means for continuously circulating said receptacles through the building, and means for turning said receptacles in timed relation to said circulating means.

14. A system of plant production comprising a light controlled and air conditioned building, plant receptacles, means for circulating said receptacles through the building, means for circulating the receptacles vertically and axially rotating the receptacles in timed relation to said first named circulating means.

15. In a system of plant production, an endless system of overhead tracks, plant receptacles held vertically suspended from said tracks, means for continuously circulating said receptacles along said tracks, and means for rotating the receptacles on a vertical axis in time relation to the movement along said tracks.

16. In a system of plant production, a system of endless tracks, plant receptacles held vertically suspended from said tracks, means for circulating said receptacles along said tracks, and means actuated by the moving receptacles for irrigating the receptacles while in motion.

17. In a system of plant production, tracks, tubular members held on said tracks, plant receptacles hung on said members, means for moving said members along said tracks, moisture absorbing material in said members and receptacles, and means for irrigating said material while the members are in motion.

18. In a system of plant production, tracks, tubular members held on said tracks, means for continuously moving said members along said tracks, plant receptacles on said members, means for axially rotating the members in timed relation to said movement, moisture absorbing material in said members and receptacles, and means for irrigating said material while the members are moving.

19. In a system of plant production, endless conveyors, members held suspended from said conveyors, means for continuously circulating said conveyors, plant receptacles on said members, and means for supplying liquid to said members while in motion, said liquid to seep into said receptacles.

20. In a system of plant production, endless tracks, plant receptacles, means for moving said plant receptacles along said tracks, and means for moving said receptacles relative to said first named moving means while the latter is moving.

21. In a system of plant production, endless tracks, receptacles held suspended from said tracks by means of cords, helical coils extending upward from said receptacles and fastened to said cords along which to train plants grown in said receptacles, and means for rotating said receptacles and coils while moving along said tracks.

22. Means for supporting growing plants comprising, a pot, suspension means for said pot, helical coils rising from said pot along which to train plants growing in the pot, and means for adjustably supporting said coils between the suspension means and the pot.

23. Means for supporting growing plants comprising, a pot, means maintaining said pot suspended from a support, and a helical structure rising from said pot along which to train plants growing in the pot, said structure being held in position by said support.

24. Means for supporting growing plants comprising, a pot, a support, helical coils rising from said pot and attached to said support along which to train plants growing in the pot, there being a number of closely packed coils at the top to be gradually released as the growing plants reach the top, thereby to cause the bottom coils to settle about the pot.

25. Means for supporting growing plants comprising, a support, helical coils held suspended from said support along which to train growing plants, there being a number of closely packed coils at the top to be released gradually as the growing plants reach the top thereby to cause the bottom coils to settle about the base of the plants.

26. A system of plant production comprising, a building, a track within said building, plant receptacles on said track, means for moving said receptacles on said track, and means for imparting other movement to the receptacles while they move on said track.

27. A system of plant production comprising, a building, a track within said building, plant receptacles on said track, means for moving said receptacles on the track, and cooperating means for imparting other movement to the receptacles in timed relation to the said moving means.

28. A system of plant production comprising, plant receptacles, means for moving said receptacles horizontally, and means for circulating the receptacles vertically in timed relation to said moving means.

29. In a system of plant production, overhead tracks, plant receptacles held suspended from said tracks, means for moving said receptacles along said tracks, and means operatively connected with said moving means for moving said receptacles vertically.

30. In a system of plant production, overhead tracks, plant receptacles held suspended from said tracks, means for circulating said receptacles along said tracks, and means operatively connected with said circulating means for rotating said receptacles axially.

31. In a system of plant production, an overhead track, plant receptacles held suspended from said track, means for moving said receptacles along the said track, and means operatively connected with said moving means for moving the receptacles vertically and axially.

32. In a system of plant production, tracks, flexible means held suspended therefrom, plant receptacles seatable in said flexible means, and helical means attachable to said flexible means above said receptacles for supporting the growing plants.

33. In a system of plant production, flexible supports, plant receptacles seatable in said supports, and plant trailing means attached to said supports above said receptacles.

34. In a system of plant production, plant receptacles, means for moving said receptacles, and irrigation ditches for supplying liquid to the plants carried along in said receptacles.

35. In a system of plant production, horizontally movable conveyors, means for moving said conveyors, plant receptacles held suspended from said conveyors, and irrigation ditches for supplying liquid to the plants carried along in said receptacles.

36. In a plant production system, conveyors, plant receptacles on said conveyors, means for moving said conveyors, and means for moving said receptacles vertically relative to the conveyors in timed relation to the movement thereof.

37. In a system of plant production, tracks, plant receptacles, supporting means for said receptacles, means for moving said supporting means along said tracks, and means controlled by said moving parts for supplying water and plant food to the receptacles.

38. In a plant production system, a housing, plant receptacles movable within said housing, means for moving said receptacles, growth inducing lamps movable within the housing, and means for moving said lamps relative to the said receptacles and beyond the limits of movement of the receptacles for the purpose of servicing.

39. In a plant production system, conveyors, upper and lower members held suspended from said conveyors by flexible means adjustable to length, plant receptacles seatable in said lower members, helical coils fastened to said means between the said members for supporting plants growing in said receptacles, some of the coils being held by said upper members gradually to be released as the plants reach the top, the flexible means being adjustable at the bottom to support the lower members at their original height.

40. A system of plant production comprising, plant receptacles, means for moving said receptacles horizontally, and means for circulating the receptacles vertically and axially in timed relation to said first named moving means.

41. In a system of plant production, supports for growing plants, means for moving said supports, and means positioned along the path of travel of said supports for applying pest and disease destroying treatment to plants held by said supports.

42. In a system of plant production, supports for growing plants, means for moving said supports, enclosures positioned along the path of travel of the supports, and means for applying pest and disease destroying treatment to the plants as they are carried on the supports through said enclosures.

43. In a system of plant production, conveyors, receptacles for growing plants on said conveyors, means for moving said conveyors, partitions positioned along the line of travel of said receptacles to form enclosures, and means for admitting pest and disease destroying substances to the spaces between the partitions.

44. In a system of plant production, conveyors, receptacles for growing plants on said conveyors, means for moving said conveyors, partitions positioned along the line of travel of said receptacles forming enclosures, door members held vertically suspended adjacent said partitions, means moving said members along the partitions in timed relation to the movement of said receptacles to form an enclosure for each receptacle as it moves between the partitions, and means for admitting pest and disease destroying substances to the moving enclosures.

45. In a plant production system installed within a building, plant receptacles, means for moving said receptacles within the building, lamps for supplying rays of desired frequencies to plants within said receptacles, and enclosures for said lamps to direct the heat generated by said lamps out of the building.

FAY D. CORNELL.